Patented Apr. 3, 1934

1,953,859

UNITED STATES PATENT OFFICE 1,953,859

COMPOSITE METAL ARTICLE

Augustus B. Kinzel, Beechhurst, Long Island, N. Y., assignor to Electro Metallurgical Company, a corporation of West Virginia No Drawing. Application June 20, 1931, Serial No. 545,841

7 Claims. (Cl. 148—16)

This invention relates to composite metallic structures or articles, more especially referring to structures or articles formed by affixing a surface layer or adjacent portion of a metal capable of subsequent hardening upon a metal base or core of different characteristics from that surface metal.

The problem frequently arises of obtaining a mechanical part or other object with a hard, abrasion-resisting surface or portion, and a main body with characteristics which are unobtainable in those metals which lend themselves to direct hardening. In such situations it is customary to resort to the use of composite metallic structures in which the base and the surface layer or other portion to be hardened are of different metals or alloys.

The production of such composite articles has been accomplished in several ways, e. g. by the surface deposition by fusion of a hard material or one that can subsequently be hardened by a drastic heat treatment, by the welding or shrinking of a sleeve or plate of such hard or hardenable material onto the base, or by the electro-deposition of a hard material onto the base. All such methods as heretofore practiced entail either one or both of the following difficulties: the material as deposited is too hard to allow easy machining and finishing, or, in the case of machinable metal subsequently hardened by heat treatment, the high temperatures required for this hardening result in the scaling, distortion, straining and general injury of the structure.

The object of my invention is to provide a composite structure which will be characterized by the peculiarity that the metal comprising the surface layer or other adjacent portions affixed to the base may be easily machined and finished, and subsequently hardened at such low temperatures that no appreciable distortion or other injury to the structure will take place. This object I have attained by a novel utilization of the properties of nitridable metals and the characteristics of the nitriding process.

According to my invention, a nitridable metal is deposited upon a base material, the resultant composite structure given whatever machining or finishing may be desired at this stage, and the structure then submitted to the nitriding process, whereby a hard surface is produced on the nitridable metal without distortion of or injury to the composite structure. The base metal may be any metal or alloy having the desired characteristics and to which that nitridable material can be welded. Without attempting to enumerate fully the base materials which can be used, it may be helpful and suggestive to point out that such base materials may be iron or steel, copper or other non-ferrous metal, a brass or bronze, or some other non-ferrous alloy. The nitridable material may be any material of this description, such as a steel alloyed with nitride-promoting agents, which will be capable as deposited of machining and subsequent nitriding. The hardened material may form a thin or thick surface layer, covering all or a part of the surface, or be a more substantial adjacent portion affixed to any portion of the base, as the problem at hand may require. In nitriding the nitridable material, any of the feasible methods may be used. Any portion or all of the surface of the nitridable material may be hardened, and the depth of hardening may be controlled by the time and temperature of nitriding.

The particular application of my invention which I prefer comprises the deposition by thermal fusion of a steel containing nitride-promoting agents upon either a soft steel or an alloy steel base or core, using a welding rod which will form a machinable and nitridable deposit. For example, using a rod comprising substantially 2% chromium, 0.30% carbon, 0.4% vanadium, 1.0% manganese and silicon, and the remainder iron, I deposited a layer of steel by the ordinary gas-torch fusion method upon a mild carbon steel base. The layer so formed was of such characteristics that it could be easily machined, for it was not in a hardened state. The composite structure so constructed I then nitrided in the usual way for 24 hours at about 460° C. in a slow stream of ammonia. At the end of this treatment I found the surface hardness, which I determined on the Monotron, to be about 1000 Brinell. The thickness of the case, as determined from a cross-section of the structure, was about eight thousandths of an inch. There had occurred no appreciable deformation of the article.

It is to be understood that I do not wish to be limited to the exact compositions or methods cited in this illustrative example, for to one skilled in the art this disclosure will immediately suggest many operable variations and modifications which will still be within the spirit of my invention as disclosed in this specification and the appended claims.

I claim:

1. The method of forming composite articles which comprises depositing by thermal fusion, from a rod composed substantially of iron and alloyed additions of nitride-promoting agents in substantially greater amounts than usually present in nitridable steels, a nitridable and machinable steel on a metallic non-nitridable base, machine-cutting at least a part of said deposit, and nitriding at least the outer surface of said steel.

2. The method of forming composite articles which comprises depositing by thermal fusion, from a rod composed substantially of 2% chromium, 0.3% carbon, 0.4% vanadium, 1.0% manganese and silicon, and the remainder to make up 100% substantially iron, a nitridable and machinable steel upon a metallic non-nitridable base, machine-cutting at least a part of said deposit, and nitriding at least the outer surface of said steel.

3. The method of forming composite articles which comprises depositing a nitridable and machinable steel on a non-nitridable metallic base, machine-cutting at least a part of said deposit, and nitriding at least part of said steel.

4. The method of forming composite articles which comprises depositing a nitridable and machinable steel, by thermal fusion from a rod composed substantially of iron and alloyed additions of nitride-promoting agents, upon a non-nitridable metallic base, machine-cutting at least a part of said deposit and nitriding at least the outer surface of said steel.

5. A composite article comprising a non-nitridable metallic base, a machine-cut portion of nitridable steel affixed to said base, and a hard nitrided surface formed on at least part of said steel.

6. A composite article comprising a non-nitridable metallic base, a machine-cut portion of nitridable steel deposited on said base by thermal fusion from a welding rod composed substantially of iron and alloyed additions of nitride-promoting agents, and a hard nitrided surface formed on at least part of said steel.

7. A composite article comprising a metallic base, a nitridable steel deposited on said base by thermal fusion from a welding rod composed substantially of 2% chromium, 0.3% carbon, 0.4% vanadium, 1.0% manganese and silicon, and the remainder to make up 100% substantially iron, and a hard nitrided surface formed on at least part of said steel.

AUGUSTUS B. KINZEL.